United States Patent [19]

Stroh et al.

[11] Patent Number: 4,663,919
[45] Date of Patent: May 12, 1987

[54] FEED REVERSER FOR A COMBINE HEADER

[75] Inventors: Clinton B. Stroh, Moline; Don L. Yarbrough, Coal Valley, both of Ill.

[73] Assignee: Deere & Company, Moline, Ill.

[21] Appl. No.: 840,984

[22] Filed: Mar. 14, 1986

Related U.S. Application Data

[63] Continuation of Ser. No. 656,127, Sep. 28, 1984, abandoned.

[51] Int. Cl.⁴ ............................................. A01D 69/08
[52] U.S. Cl. ....................................... 56/11.2; 56/11.7
[58] Field of Search .................... 56/10.7, 11.2, 11.7; 474/1, 4

[56] References Cited

U.S. PATENT DOCUMENTS

| | | | |
|---|---|---|---|
| 3,217,604 | 11/1965 | Knox | 91/44 |
| 3,458,005 | 7/1969 | Malmi et al. | 180/44 |
| 3,726,801 | 4/1973 | Sterner et al. | 254/187 R |
| 3,808,949 | 5/1974 | Muncke et al. | 91/473 |
| 4,138,837 | 2/1979 | Love | 56/11.2 |
| 4,218,864 | 8/1980 | Allemeersch et al. | 56/11.2 |
| 4,275,616 | 6/1981 | Ehrlinger et al. | 74/730 |
| 4,430,847 | 2/1984 | Tourdot et al. | 56/10.7 |
| 4,467,590 | 8/1984 | Musser et al. | 56/11.9 |

OTHER PUBLICATIONS

Allis Chalmers Operator's Manual, "Gleaner N5, N6 & N7-Self-Propelled Combine", Oct. 1983, p. 58.
Droningborg Advertisement, Power Farming, Apr. 1984, p. 228.
Richards News Clip, Successful Farming, Jun.-Jul. 1983, p. 31.

Primary Examiner—Paul J. Hirsch

[57] ABSTRACT

In a combine harvester, a supplementary header drive is provided for driving the header components in reverse as needed, for example, for clearing blockages of crop material in a platform auger or in the feederhouse conveyor. The drive is powered by a hydraulic motor and selectively connected to the header drive system by a hydraulically actuated clutch. Clutch and motor are connected in parallel to the hydraulic power source and components are designed and sized so that the hydraulically actuated clutch engages before the hydraulic motor begins to rotate.

13 Claims, 8 Drawing Figures

FEED REVERSER FOR A COMBINE HEADER

This application is a Continuation of application Ser. No. 656,127, filed Sept. 28, 1984 now abandoned.

BACKGROUND OF THE INVENTION

The invention concerns auxiliary or supplementary means for driving the feeder conveyors of a mobile harvester and more particularly means for driving them in reverse for the purpose of clearing blockages.

Selectively operable reverse drives for various conveyors of harvesting machines, including those of a header of a combine, are well known. Their principal use is in assisting an operator to clear crop material or foreign bodies when the feeding system becomes plugged or jammed during harvesting operation. Typically, the reverse drive is engaged sufficiently to "back up" some of the wedged material so that an operator can remove it by hand and/or redistribute it so that it can be handled by normal forward operation of the conveyor.

Ideally, a reversing system should be safe and convenient to use, effective and reliable in operation, use simple components and controls be relatively low in cost. Ready adaptability of a basic system to a variety of harvesters is of course a cost factor. Known reversers fall short of this ideal in one respect or another.

Although reverser arrangements have wide applicability in harvesting machines, for convenience, the following discussion will be confined to the exemplary embodiment of the combine harvester.

Love's reverser (U.S. Pat. No. 4,138,837, also assigned to the assignee of the present invention) makes use of a reversible planetary gear drive in a combine header transmission. The arrangement is functionally good — Love takes advantage of the gear transmission to provide a reduced speed, high torque reverse mode and avoidance of simultaneous engagement of forward and reverse is inherent in the arrangement — and on a self-propelled combine, proximity of the operator's station makes use of a simple mechanical or cable control feasible. However, although highly reliable, the system is relatively expensive and less attractive for a pull-type combine where the operator's station (of the towing tractor) is quite remote from the feederhouse of the combine where the reversible gear transmission is normally mounted.

In the Love arrangement, the regular combine mechanical power train and drive input is used to power the reverser but in another approach, exemplified by Richards (Successful Farming, June-July 1983, page 31) the reverser power source is an electric motor carrying a pinion engaging a ring gear on a drive shaft of the header. This is a relatively simple system of moderate cost in its self-propelled combine application. However, it is less attractive for the pull-type combine application because of problems of electrical power transmission over the relatively long distance between the electrical power source on the towing tractor and the electric motor on the header.

Droningborg (advertisement, Power Farming, April 1984, page 228) and Tourdot (U.S. Pat. No. 4,430,847) both use electrohydraulic systems for header reversers with a hydraulic motor as the drive actuator in both cases. Use of an auxiliary hydraulic motor as the reverse drive actuator offers advantages over a mechanical (gear) reversible drive forming an integral part of the regular forward drive system of the header conveyors but the potential advantages are not fully realized in Tourdot. The hydraulic motor is interposed at a point in the conveyor drive system which requires that the whole header be driven in reverse through the drive belt of one of its component parts (the upper conveyor portion) requiring that this drive section be adequate for its double duty. Tourdot upgrades this drive section for the reverse drive requirement, in part by adding the cost and complication of means for automatically adjusting a belt idler when the reverse drive mode is selected. In addition, Tourdot uses an automatic clutch which, at least when used in combination in a commercial embodiment of his invention, requires that the operator, in changing from the reverse mode to forward mode of the header drives, waits for "at least seven seconds" before engaging forward drive so as to avoid damaging the automatic clutch (Operator's Manual Allis-Chalmers Gleaner N5, N6, and N7 Self-Propelled Combines, Oct. 1983, page 58).

SUMMARY OF THE INVENTION

Accordingly, it is an object of the invention to provide a drive reversing arrangement for the header of a combine harvester which is relatively simple and low in cost, easy and convenient to operate, which avoids unusual loading of existing components of the drive system, and which substantially eliminates the possibility of simultaneous powering of both forward and reverse actuators of the system. It is also an object to provide a system which is well adapted to both self-propelled and pull-type combines.

These objects are realized in part by using, for reverse drive actuation, a hydraulic motor in combination with a hydraulically actuated clutch, clutch and motor being connected in parallel and having pressure characteristics such that, upon pressurization of the components, the clutch engages before the motor begins to turn. Using fluid power rather than mechanical or electrical power for actuation of the reverse drive, facilitates application of such a drive to a pull-type combine where the header is relatively remote from the power sources and operator station of the pulling tractor.

It is a feature of the invention that the compact simple drive arrangement makes it feasible to locate the hydraulic motor conveniently beneath or alongside a lower portion of the feederhouse of the header and for the reverse drive power input to be interposed at the same point in the header drive system as that used in forward drive so that individual components of the header drive system are not subjected to unusual loading by being required to transmit power to additional components of the system.

DESCRIPTION OF THE PREFERRED EMBODIMENT

Figure 1:
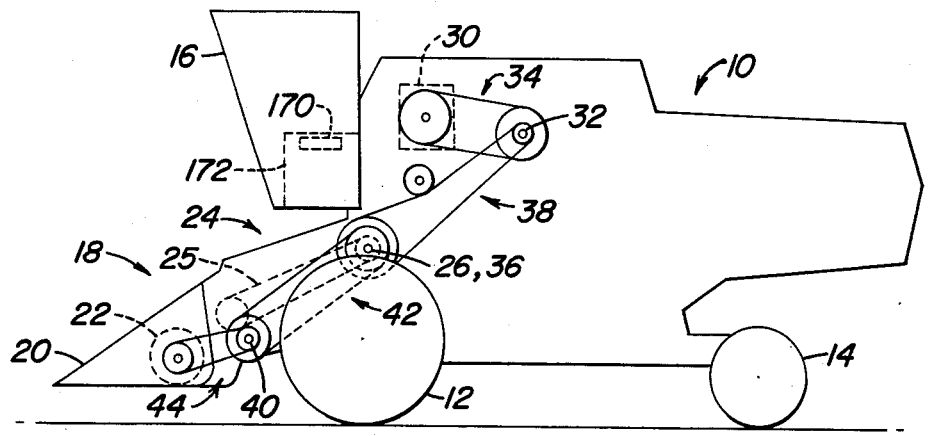
FIG. 1 is a schematic left-hand side elevation of a self-propelled combine embodying a header reverser system according to the invention.

The invention is embodied in an otherwise generally conventional self-propelled combine harvester of the type illustrated in schematic side view in FIG. 1. The combine body 10 is supported above the ground on a pair of forward drive wheels 12 and steerable rear wheels 14 and controlled from an operator's station 16. In the forward mounted header 18, the transverse gatherer 20, assisted by its platform auger 22, gathers and converges crop material and delivers it to a central upwardly and rearwardly extending feederhouse 24 in which a conventional feeder conveyor 25 conveys it to the threshing cylinder (not shown). The header pivots about a transverse axis 26 at the connection of the feederhouse 24 to the combine body 10. Operating height of the gatherer is controlled by conventional lift cylinders 28 shown only in FIG. 3.

The prime source of power for the combine is its engine 30 which powers a primary countershaft 32 through a primary countershaft belt drive 34. Power is transmitted by a header countershaft drive 38 down to a header countershaft assembly 36, coaxial with the header pivot axis 26 and from there to a transverse header backshaft 40 by a header backshaft drive 42. The drive 44 from the header backshaft 40 to the platform auger 22 is also shown in FIG. 1.

Figure 2:
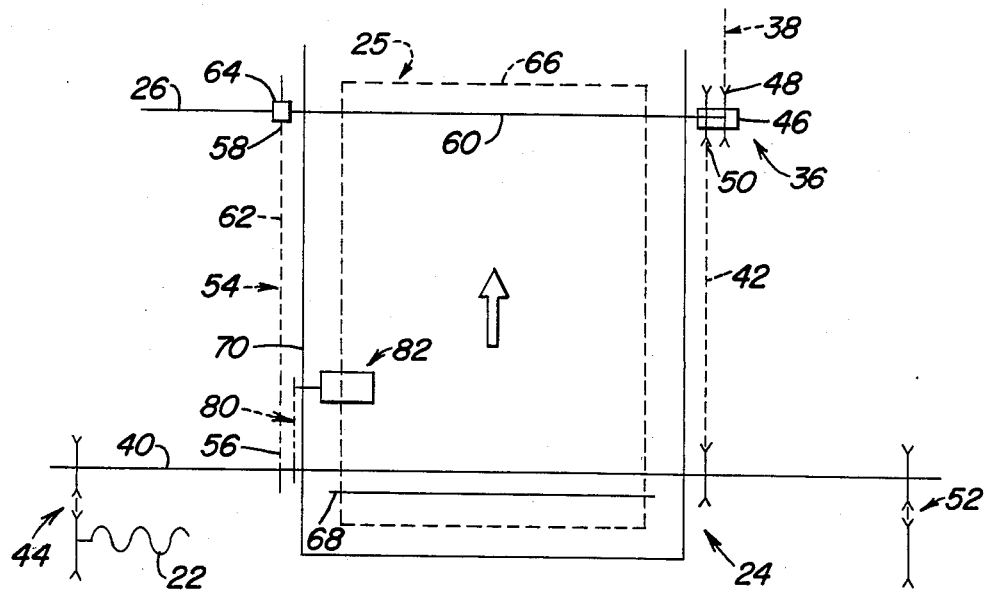
FIG. 2 is an overhead schematic view showing components of the header drive system and the input of the header reverser to that system.

The schematic overhead view of FIG. 2 includes additional details of the header drive arrangement. The header drive countershaft assembly 36 includes an electric clutch 46 effective between the countershaft driven sheave 48 and the header drive sheave 50. From the header backshaft 40 power is transmitted to the principal components of the header and the backshaft 40 may be considered to be the drive input for the header including its conveyor system. The drives include, in addition to the platform auger drive 44 already mentioned, a knife drive 52 and the feederhouse conveyor drive 54. Power is transmitted from a drive sprocket 56 on the header backshaft 40 to a driven sprocket 58 on the feeder conveyor drive or upper shaft 60 by a roller chain 62. The input to the feeder conveyor 25 is protected by a torque limiting or slip clutch 64 effective between the driven sprocket 58 and the shaft 60. The slatted endless belt-type feeder conveyor chain 66 is trained around sprockets (not shown) on the driven shaft 60 and a lower idler shaft 68. The feeder conveyor 25 is substantially surrounded by a feeder housing 70 of substantially rectangular cross section and constituting the principal body or frame structure of the feederhouse 24.

Figure 3:
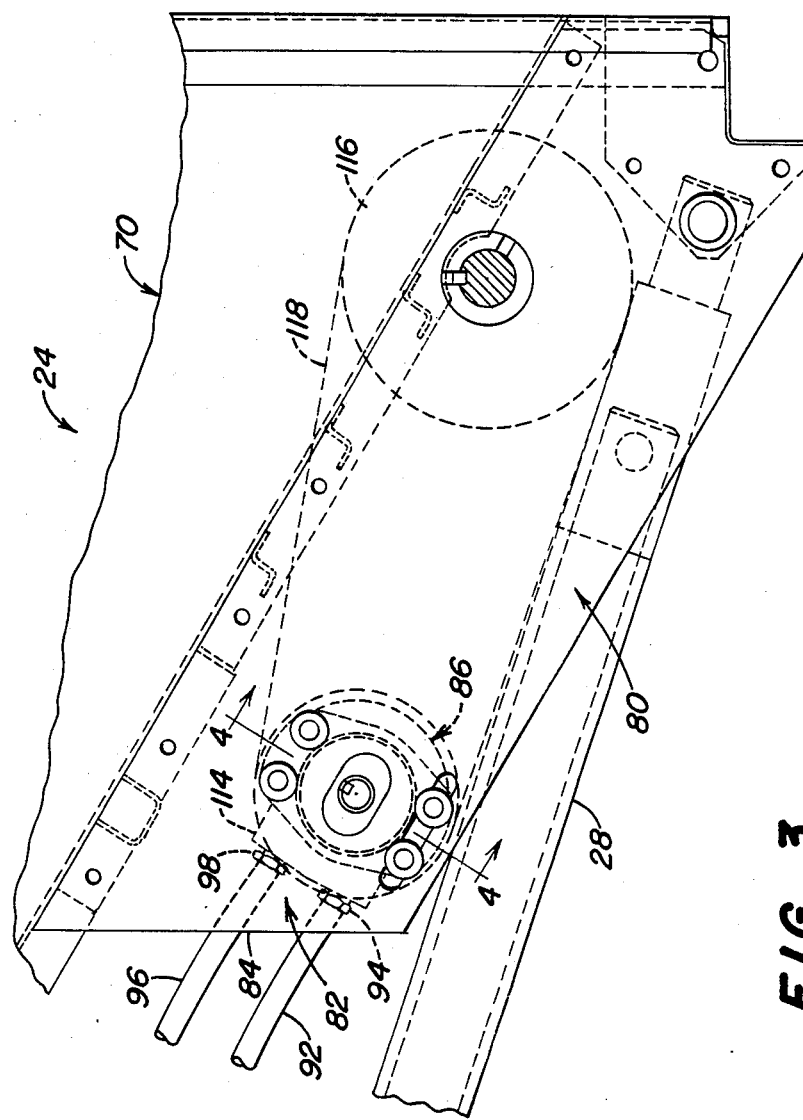
FIG. 3 is an enlarged partial right-hand side elevation of the drive portion of the header reverser system disposed adjacent the underside of a right-hand forward portion of the feederhouse of the combine.
Figure 4:
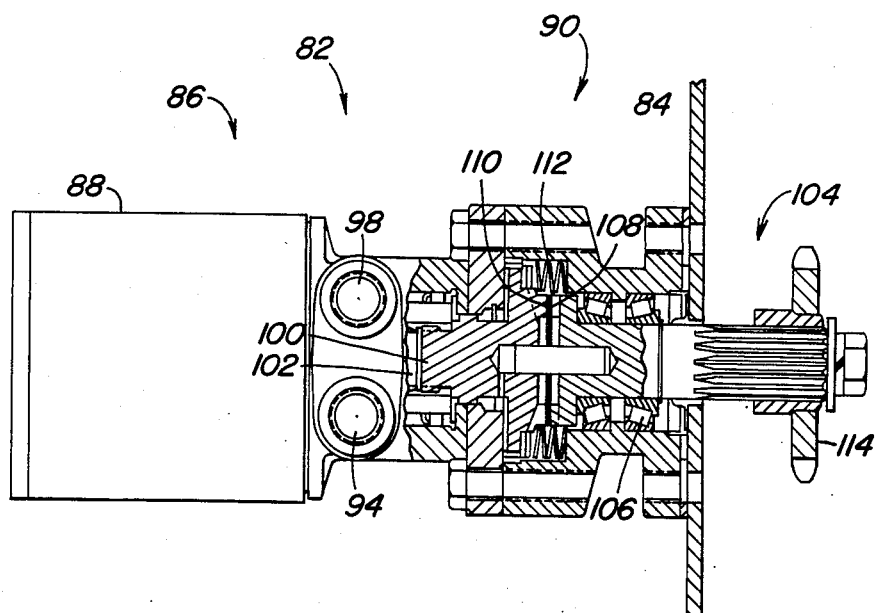
FIG. 4 is a partially sectioned enlarged view of the hydraulic motor and coaxial clutch combination of the drive arrangement of FIGS. 2 and 3 taken approximately on line 4—4 of FIG. 3.

FIG. 2 also shows, schematically, a supplementary or auxiliary drive 80 for the header. More details are shown in FIGS. 3 and 4. A drive actuator or power input assembly 82 is supported beneath a lower right-hand portion of the feederhouse 24 by a bracket 84. The actuator assembly 82 comprises a hydraulic motor 86 having a motor body 88 and coaxial with it a motor body extension 90 (FIG. 4). Hydraulic hose 92 connected to motor inlet 94 supplies hydraulic fluid under pressure. A return hose 96 is connected to motor outlet 98. As may be seen in FIG. 4, a motor output member 100 is permitted some axial freedom and the motor inlet 94 as well as serving the conventional rotary actuator portion of the motor (not shown in any detail) communicates with a chamber 102 so that the output member 100 acts as a piston connected in parallel with motor when the system is pressurized. A drive actuator output assembly 104, journaled in the body extension 90 by bearings 106, includes at its inner end an annular clutch face 108 registering with a similar clutch face 110 on the outer end of the motor output member (piston) 100. In the absence of fluid pressure on the output member 100, positive separation of the clutch faces 108, 110 is effected and maintained by a series of Belleville springs 112. The actuator output assembly 104 includes a drive sprocket 114 which transmits power to a driven sprocket 116 on the header backshaft 40 through a drive chain 118.

Figure 5:
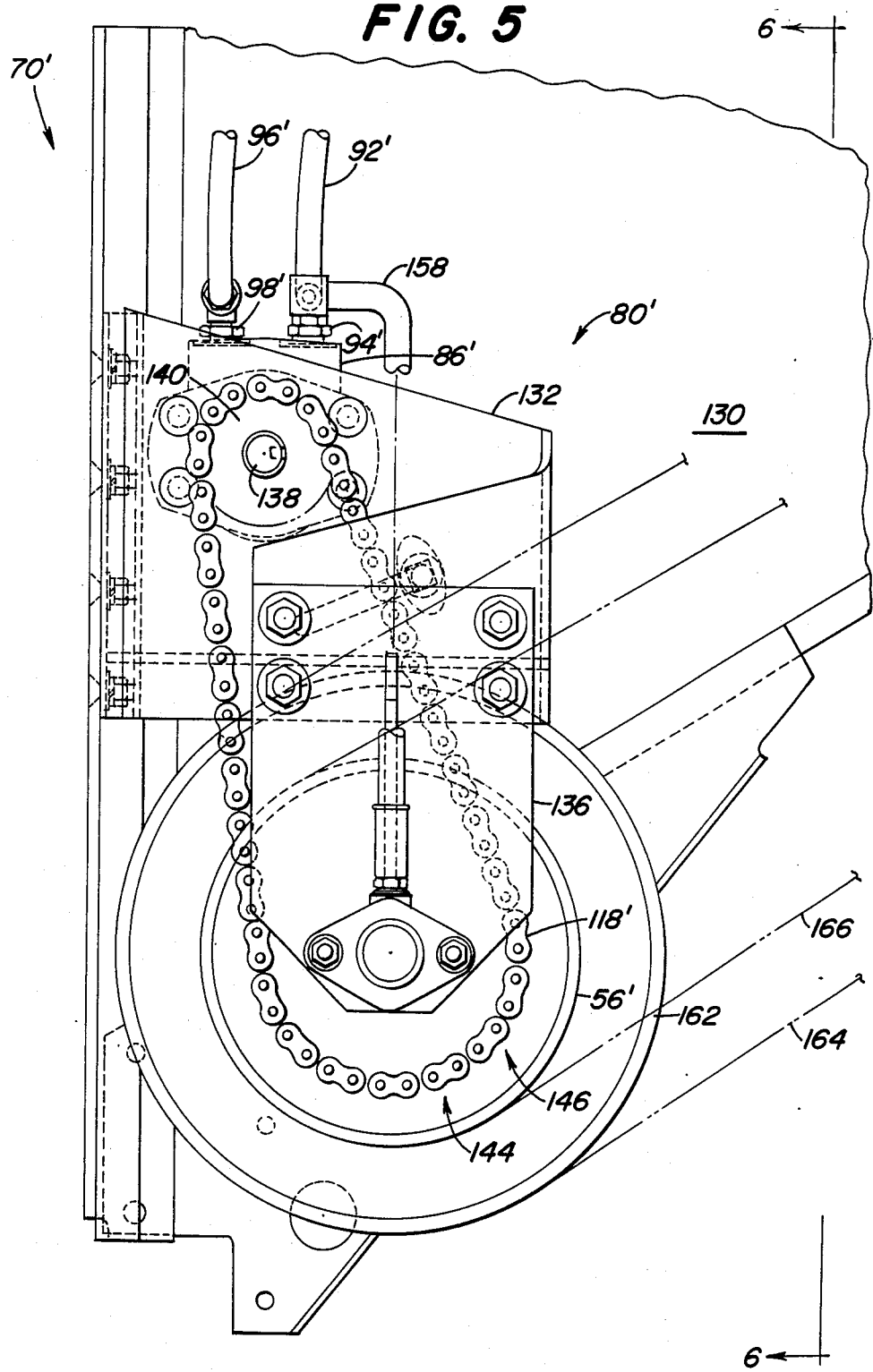
FIG. 5 is an enlarged partial left side elevation of the drive portion of an alternative embodiment of the invention showing the reverse drive hydraulic motor and its input to the header drive system of the combine adjacent a forward portion of the left-hand sidewall of the combine feederhouse.
Figure 6:
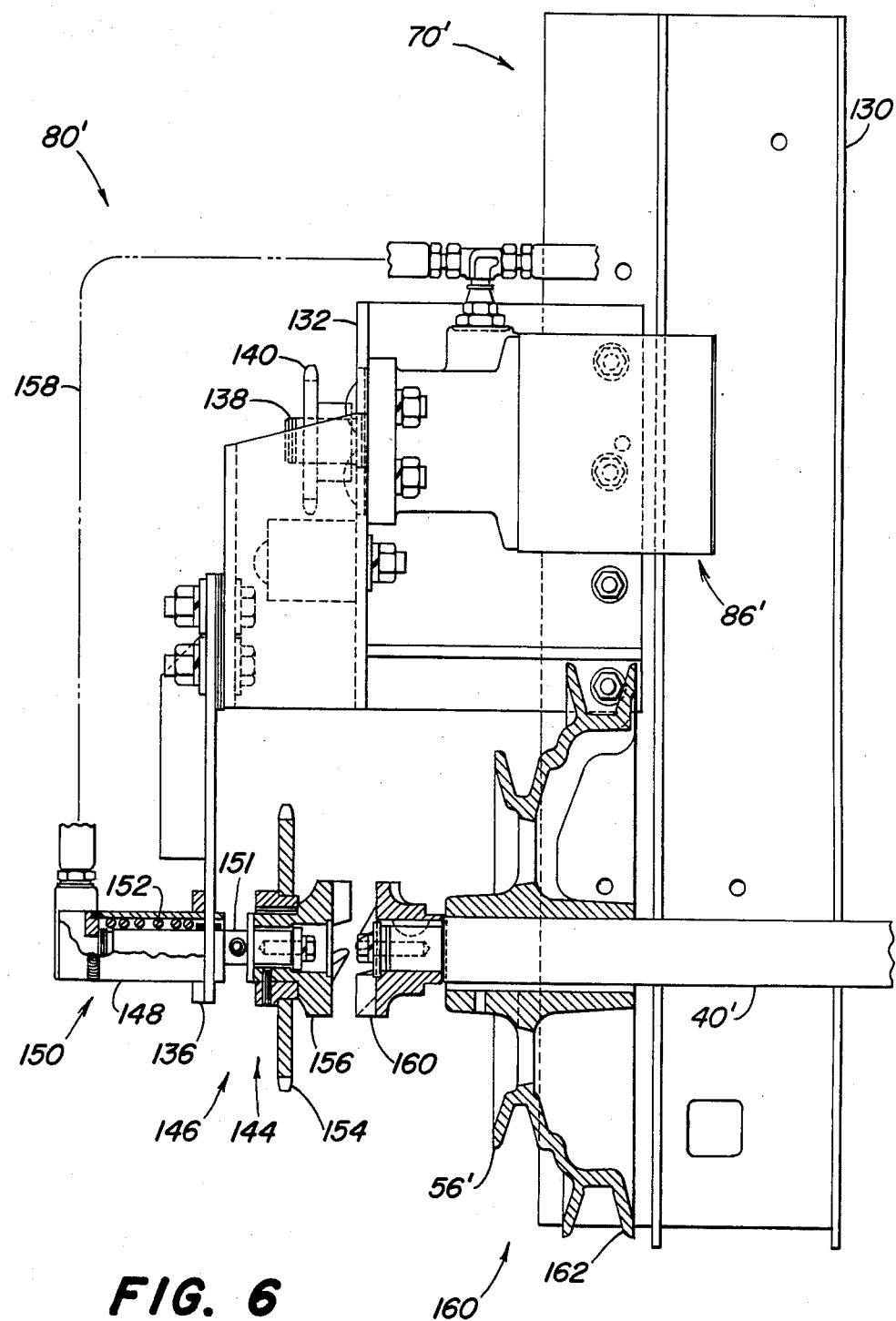
FIG. 6 is a partial rear view taken approximately on line 6—6 of FIG. 5.

In an alternative embodiment shown particularly in FIGS. 5 and 6, an auxiliary drive assembly 80' is carried adjacent a lower forward portion of the left-hand wall 130 of the feederhouse body 70'. A motor bracket 132 supports the hydraulic motor 86' and also, a downwardly extending clutch bracket 136. The motor output shaft 138 carries a drive sprocket 140 and a drive chain 118' connects it to a driven sprocket assembly 144 which forms part of a clutch actuator assembly 146 supported by the clutch bracket 136. In the clutch or actuator assembly 146, the body 148 of a hydraulic linear actuator 150 is carried outboard of the bracket 136 and houses rod or piston 151 which works against a compression spring 152. The sprocket assembly 144 is carried on the piston rod 151 inboard of the bracket 136 and includes, as well as the driven sprocket 154, an annular jaw clutch half 156, coaxial with the sprocket 154 and the piston rod 151. The hydraulic motor 86' is served by inlet and return hoses 92', 96', respectively, connected to the inlet and outlet ports of the motor 94', 98', respectively. A clutch actuator hose 158 is connected between the motor inlet 94' and the linear actuator 150 thus connecting the hydraulic motor 86' and the linear actuator in parallel.

In this alternative embodiment, the header backshaft 40' which stops short adjacent the left-hand side of the feederhouse 70' carries a double sheave 160. V-groove 162 receives the drive input from the header countershaft and V-groove 56' transmits it to the feeder conveyor by V-belts 164, 166 respectively. Other header drives, including that of the platform auger are taken from the right-hand end of the backshaft 40' (not shown). The auxiliary drive assembly 80' is mounted so that the clutch half 156 is coaxial with the header backshaft 40' and engageable with a clutch half 160 fixed to the end of the backshaft 40'.

Figure 8:
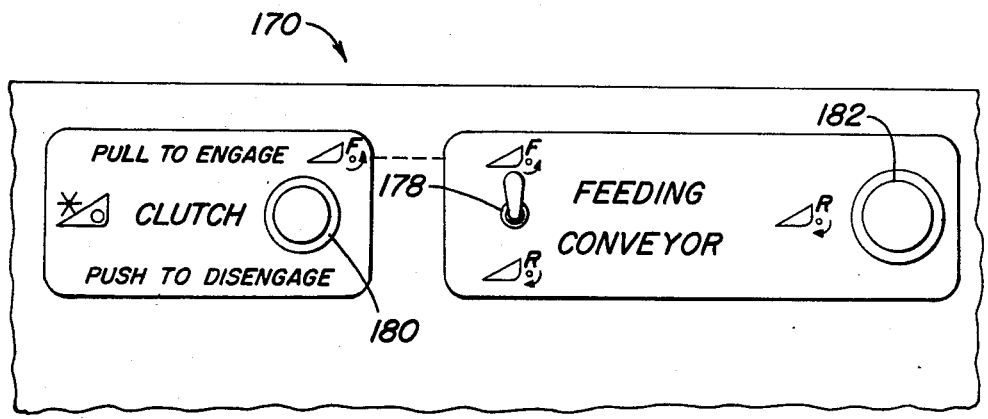
FIG. 8 is an enlarged partial view of the control panel for the header drive system.
Figure 7:
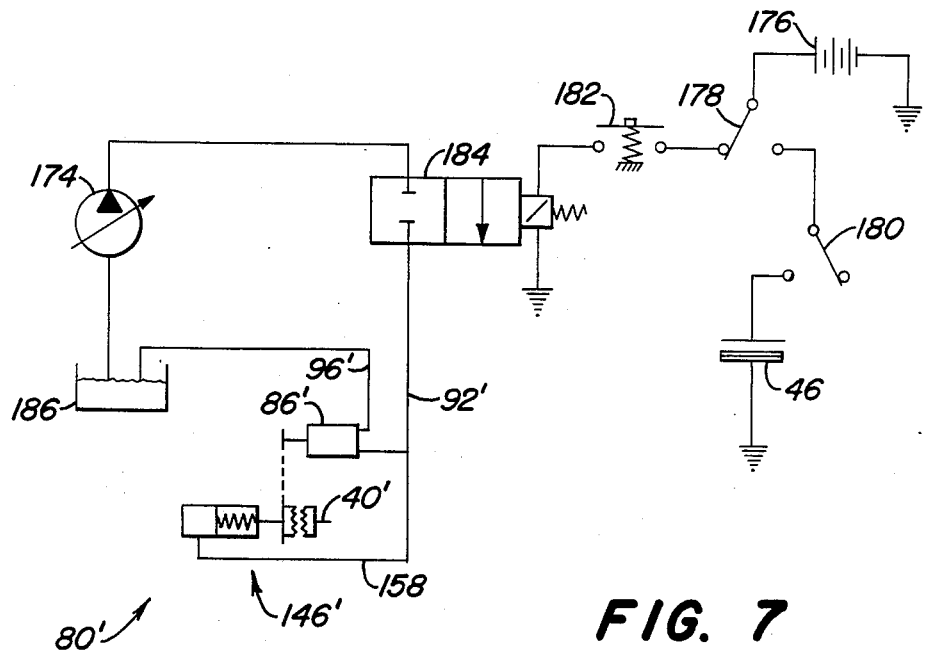
FIG. 7 is a partial schematic electrohydraulic circuit diagram for a header drive system according to the invention.

The combine operator controls the header drive system through an electrohydraulic control system shown in simplified schematic form in FIG. 7, from a control panel 170 forming part of a control console 172 at the operator station 16. The control panel 170 is shown in some detail in FIG. 8. The control system and method of operation are essentially the same for the two embodiments of the invention described above. However FIG. 7, with respect to the auxiliary drive actuation, shows only the second embodiment (80').

For normal, forward drive of the header system, as in harvesting operation, the power input is purely mechanical and is taken from the engine 30 through the power train described above with reference to FIGS. 1 and 2. For the auxiliary drive mode, which here means driving the header conveyor systems in reverse, the immediate power source is hydraulic, by way of pump 174 driven by the engine 30 by conventional means (not shown). The basic control element used in selecting between regular forward drive of the header components and auxiliary reverse drive is the electric clutch 46 (at the header drive countershaft assembly 36) which depends on a source of electrical power 176 maintained at least in part by the engine 30, as is conventional.

The operator selects forward or reverse operation by means of a double-throw single-pole toggle switch 178 on the control panel 170. For both drive modes, an additional switching operation is required before the drive system is actuated. In the forward drive mode, a "push-pull" switch 180 must still be closed to actuate the electric clutch 46 and connect the header conveyor drive train to the engine.

For the reverse or auxiliary mode, a momentary contact push-button switch 182 must be closed to energize and open a normally closed valve 184, thus connecting the hydraulic motor 86' and the clutch actuator assembly 146' to the pump 174, in part through connecting hoses 92' and 158. Return hydraulic flow to hydraulic reservoir 186 is by way of return hose 96' connected to the motor 86' and continuing through conventional fluid conducting means.

The nature of the selector switch 178 makes it impossible to power the forward and reverse drive systems of the header simultaneously, thus avoiding potential damage to the systems. Beyond this, the individual switches (180, 182) in the respective systems require a specific action on the part of the operator to complete electrical connection and hence actuation of the respective systems. The particular type of switch chosen in each case is not only convenient but well suited functionally. In the case of normal, forward harvesting operation, the push-pull switch 180, with a maintained closed condition when pulled out, maintains continuous operation of the drive system by keeping the electric clutch 46 engaged. But the switch button can be pushed in very rapidly in case of emergency when immediate interruption of the drive train is desirable. In the case of the auxiliary or reverse drive mode, used principally for clearing blockages in the platform auger 22 or the feederhouse conveyor 25, short applications of power are often effective and desirable and this is facilitated by the momentary contact (push-button) switch 182. In both modes of operation, overloading and damage of components is protected by slip clutches such as the mechanical slip clutch 64 at the feederhouse conveyor upper shaft 60. And in the auxiliary mode, a conventional pressure relief valve or valves in the hydraulic system (not shown) provide additional overload protection.

In both embodiments of the auxiliary or reverse drive mode, actual mechanical connection or completion of the drive connection to the header conveyors is by means of a hydraulic linear actuator. In both embodiments, the hydraulic motor pressure inlet and the linear actuator are connected in parallel so that motor and actuator are pressurized simultaneously when connected with the fluid pressure supply (pump 174). In both cases, components are sized so that the linear actuator strokes and engages its respective clutch before its hydraulic motor begins to rotate. In each case, the pressure required to overcome the spring force maintaining the clutches in a normally open condition is less than the threshold pressure required for actuation of the respective hydraulic motor. Upon release of the push-button switch 182 and hence closing of the valve 184, the substantially direct return to tank (hydraulic reservoir, 186, FIG. 7) ensures a virtually immediate pressure drop in the supply line to the motor and clutch actuator and results in an almost immediate loss of torque at the hydraulic motor, so that torsional force between the engaged clutch members declines rapidly, enabling the clutch return springs to positively disengage their respective clutches. Thus upon release of the push-button 182, at the completion of an unplugging operation, disengagement of the reverse drive system is almost instantaneous. Disengagement does not require a waiting period and the system is relatively insensitive to minor torsional forces at the clutch members which may be caused by residual fluid pressures. Clutch operation is essentially independent of motor rotation and if desired, forward drive of the header components and hence harvesting operation may be resumed without delay. The characteristics of the clutching system used for the reverse drive mode, with positive and rapid disengagement, help to minimize any possibility of simultaneous engagement of both forward and reverse drive components and potentially serious damage to components of the system.

We claim:

1. In a mobile harvester having a power source including electrical and hydraulic systems having electric and hydraulic power outputs respectively, the hydraulic system having a reservoir, and including a crop processor, a header for gathering crop material from a field and having a conveyor system for conveying gathered crop material to the processor, and a regular drive train connecting the power source to the conveyor system at a driven input for driving it in a forward direction of conveying towards the processor and first control meeans for selectively disconnecting the drive train from the power source, a selectively operable supplementary drive arrangement for driving the conveyor system in a reverse direction comprising:

a hydraulic motor having a rotatable output element and operable to commence rotation at a threshold pressure greater than a predetermined minimum;

drive means for connecting the hydraulic motor output element to the conveyor system at the drive input;

a hydraulically actuated clutch included in the drive means, external to the motor and operable to complete the drive connection between the motor output element and the conveyor system, responsive to a hydraulic pressure lower than the motor threshold pressure;

hydraulic fluid lines for connecting the motor and hydraulic clutch in parallel to the hydraulic power source and including a normally closed valve; and second, electrohydraulic control means connected to the power source and including means for opening the valve so that, by virtue of the parallel connection, both the hydraulic clutch and the hydraulic motor are subject to pressurization substantially simultaneously by release of fluid into the fluid lines, said pressure tending to increase with time so that the hydraulic clutch, responsive to said lower operating pressure, is acutated to complete the drive connection between the motor and the conveyor system before a further increase in supply pressure causes the hydraulic motor output element to commence rotation and drive the conveyor.

2. The drive arrangement of claim 1 werein the first and second control means include a common control element selectively operable to connect the hydraulic motor to the hydraulic power source only when the regular drive connection between the power source and the conveyor system is interrupted.

3. The drive arrangement of claim 2 wherein the drive train between the power source and the conveyor system includes an electically actuated clutch and wherein the common control element is a switch operative to de-energize the electric clutch and to energize the hydraulic motor for reverse drive.

4. The drive arrangement of claim 1 wherein the hydraulic clutch includes coaxial input output elements connected respectively to the hydraulic motor output element and the conveyor system and the clutch input element is coaxial with the hydraulic motor output element.

5. The drive arrangement of claim 1 wherein the conveyor system includes a torque limiting element and wherein the drive connection of the hydraulic motor to the conveyor system, when connected, also includes said torque limiting element so that said torque limiting element is operable to limit torque applied to the conveyor when driven by the regular drive train and when driven in reverse by the supplementary drive means.

6. The drive arrangement of claim 1 wherein the hydraulic clutch is biased so that the hydraulic motor output element is normally disconnected from the conveyor system so that reduction of fluid pressure below a predetermined minimum actuates the clutch to disconnect the motor from the conveyor responsive to the reduction in hydraulic pressure.

7. The drive arrangement of claim 1 wherein the hydraulic clutch is a normally disengaged spring-biased clutch and includes a rotatable input portion drivably connected to the hydraulic motor and a hydraulic linear actuator coaxial with the rotatable input element.

8. The drive arrangement of claim 1 wherein the conveyor system includes a feederhouse portion having a rearwardly and upwardly sloping housing having a forward inlet and a rearward outlet and wherein the header includes a platform connected in a material delivery relationship to the feederhouse inlet and wherein the conveyor drive system includes a header drive shaft extending transversely adjacent the feederhouse inlet end and constituting the drive input and wherein the hydraulic motor is carried by the feederhouse and wherein the drive connection between the motor and the conveyor system includes a drive portion directly connectible between the motor output element and the header drive shaft.

9. The drive arrangment of claim 8 wherin the hydraulic motor is carried beneath the feeder house adjacent the forward inlet end.

10. The drive arrangement of claim 1 wherein the drive means for connecting the hydraulic motor output to the conveyor system includes means connecting directly with the drive input of the conveyor system.

11. The drive arrangment of claim 1 and further including a hydraulic fluid return line connecting the hydraulic motor substantially directly to the hydraulic reservoir.

12. The drive arrangement of claim 8 wherein the linear actuator is spaced from and parallel to the axis of rotation of the output element of the motor.

13. The drive arrangement of claim 12 wherein the drive input of the conveyor system includes a transverse header drive shaft and the linear actuator is coaxial with the header drive shaft.

* * * * *

UNITED STATES PATENT AND TRADEMARK OFFICE
CERTIFICATE OF CORRECTION

PATENT NO. : 4,663,919

DATED : 12 May 1987

INVENTOR(S) : Clinton B. Stroh et al.

It is certified that error appears in the above-identified patent and that said Letters Patent is hereby corrected as shown below:

Column 6, line 45, delete "driven" and insert therefor -- drive --; line 47, delete "meeans" and insert therefor -- means --.

Column 8, line 23, delete "wherin" and insert therefor -- wherein --.

Column 8, line 34, delete "8" and insert therefor -- 7 --.

Signed and Sealed this

Fifth Day of September, 1989

Attest:

DONALD J. QUIGG

Attesting Officer

Commissioner of Patents and Trademarks